(12) United States Patent
Hung

(10) Patent No.: US 8,942,524 B2
(45) Date of Patent: Jan. 27, 2015

(54) OPTICAL COUPLING LENS AND OPTICAL FIBER COUPLING CONNECTOR

(71) Applicant: Hon Hai Precision Industry Co., Ltd., New Taipei (TW)

(72) Inventor: Yi Hung, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/950,380

(22) Filed: Jul. 25, 2013

(65) Prior Publication Data

US 2014/0178002 A1    Jun. 26, 2014

(30) Foreign Application Priority Data

Dec. 20, 2012   (TW) .............................. 101148705 A

(51) Int. Cl.
*G02B 6/32*   (2006.01)
(52) U.S. Cl.
CPC ..................................... *G02B 6/322* (2013.01)
USPC ........................................................... 385/33
(58) Field of Classification Search
USPC .......... 385/14, 16, 31, 32, 33, 37, 41, 47, 147
See application file for complete search history.

(56) References Cited

U.S. PATENT DOCUMENTS

| 2014/0002907 A1* | 1/2014 | Liu  | 359/641 |
| 2014/0003768 A1* | 1/2014 | Hung | 385/33 |
| 2014/0178017 A1* | 6/2014 | Lin  | 385/89 |
| 2014/0199024 A1* | 7/2014 | Kuo  | 385/33 |
| 2014/0199025 A1* | 7/2014 | Kuo  | 385/33 |

* cited by examiner

*Primary Examiner* — Akm Enayet Ullah
(74) *Attorney, Agent, or Firm* — Novak Druce Connolly Bove + Quigg LLP

(57) ABSTRACT

An optical coupling lens includes a body portion, two locating posts, and two converging portions. The body portion includes a first surface, a second surface perpendicular to the first surface, and a reflecting surface obliquely interconnected between the first surface and the second surface. The first surface defines two light-passing recesses. The locating posts perpendicularly extend from the first surface. The converging portions are formed on the second surface and correspond to the light-passing recesses. The reflecting surface is configured for reflecting parallel light beams from one light-passing recess toward a corresponding converging portion, and for reflecting parallel light beams from one converging portion toward a corresponding light-passing recess.

12 Claims, 4 Drawing Sheets

OPTICAL COUPLING LENS AND OPTICAL FIBER COUPLING CONNECTOR

BACKGROUND

1. Technical Field

The present disclosure relates to communication technologies, and particularly to an optical coupling lens and an optical fiber coupling connector.

2. Description of Related Art

An optical fiber coupling connector is used in fiber-optic data transmission. The optical fiber coupling connector includes a light-emitting module, a light-receiving module, and two optical fibers. The light-emitting module and the light-receiving module are linearly optically coupled with the respective optical fibers. However, the linear connection takes up a lot of space.

Therefore, it is desirable to provide an optical coupling lens and an optical fiber coupling connector, which can overcome or at least alleviate the above-mentioned problems.

DETAILED DESCRIPTION

Figure 1:
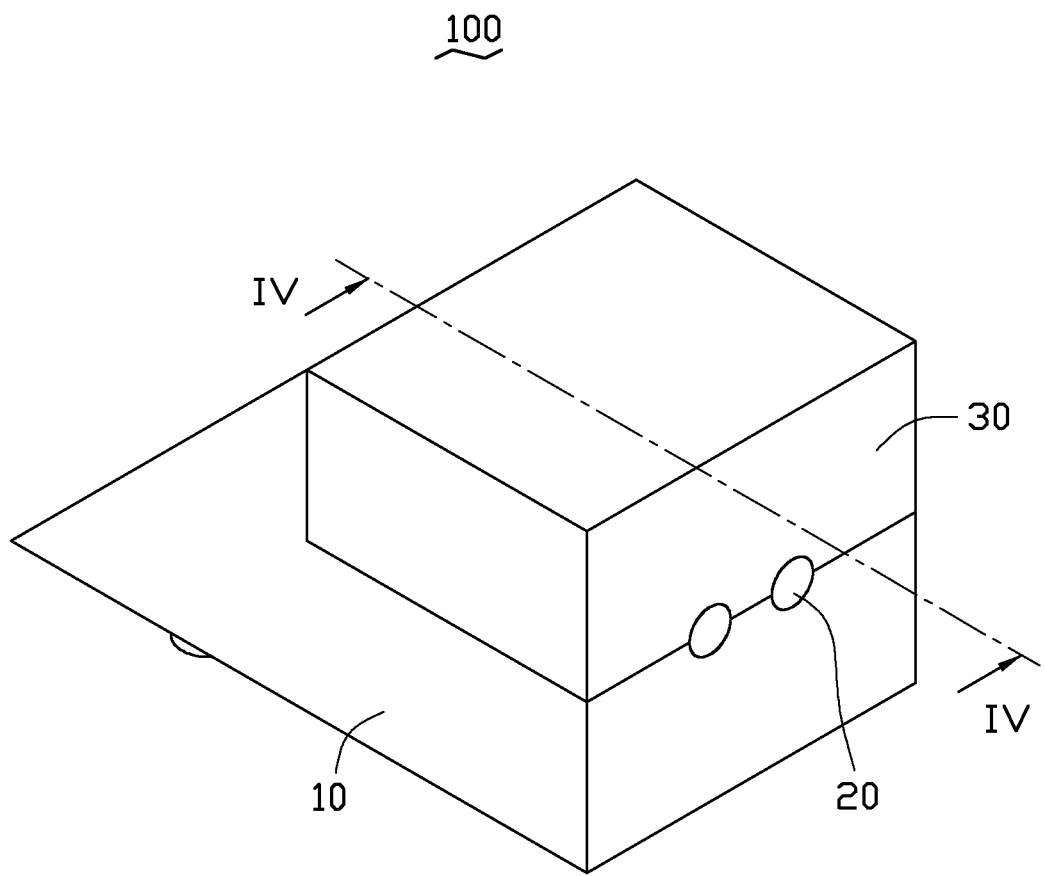
FIG. 1 is a schematic, isometric view of an optical fiber coupling connector, according to an exemplary embodiment.

FIG. 1 shows an optical fiber coupling connector 100 according to an exemplary embodiment. The optical fiber coupling connector 100 includes an optical coupling lens 10, two optical fibers 20, and a cover 30.

Figure 2:
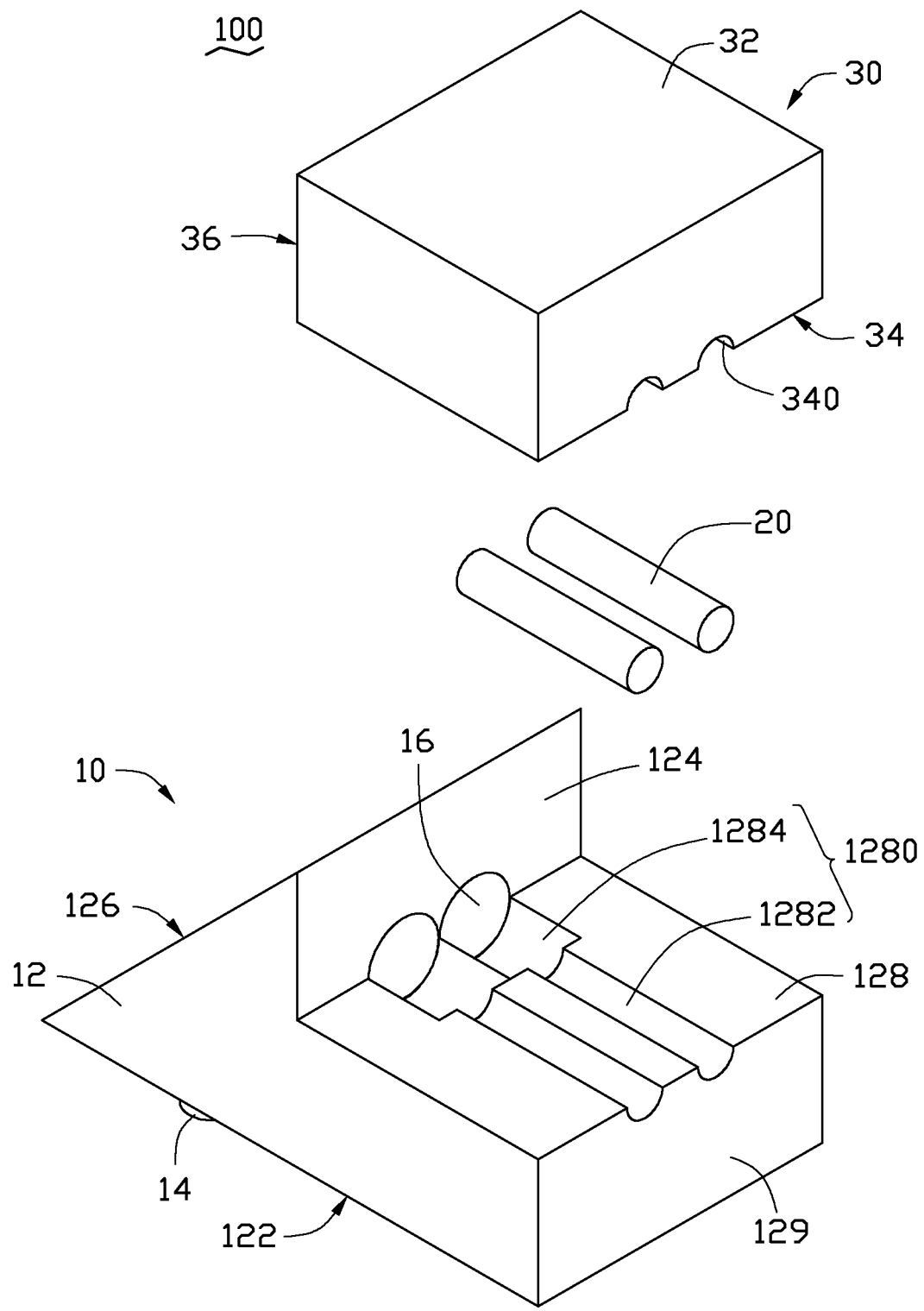
FIG. 2 is an exploded view of the optical fiber coupling connector of FIG. 1.
Figure 3:
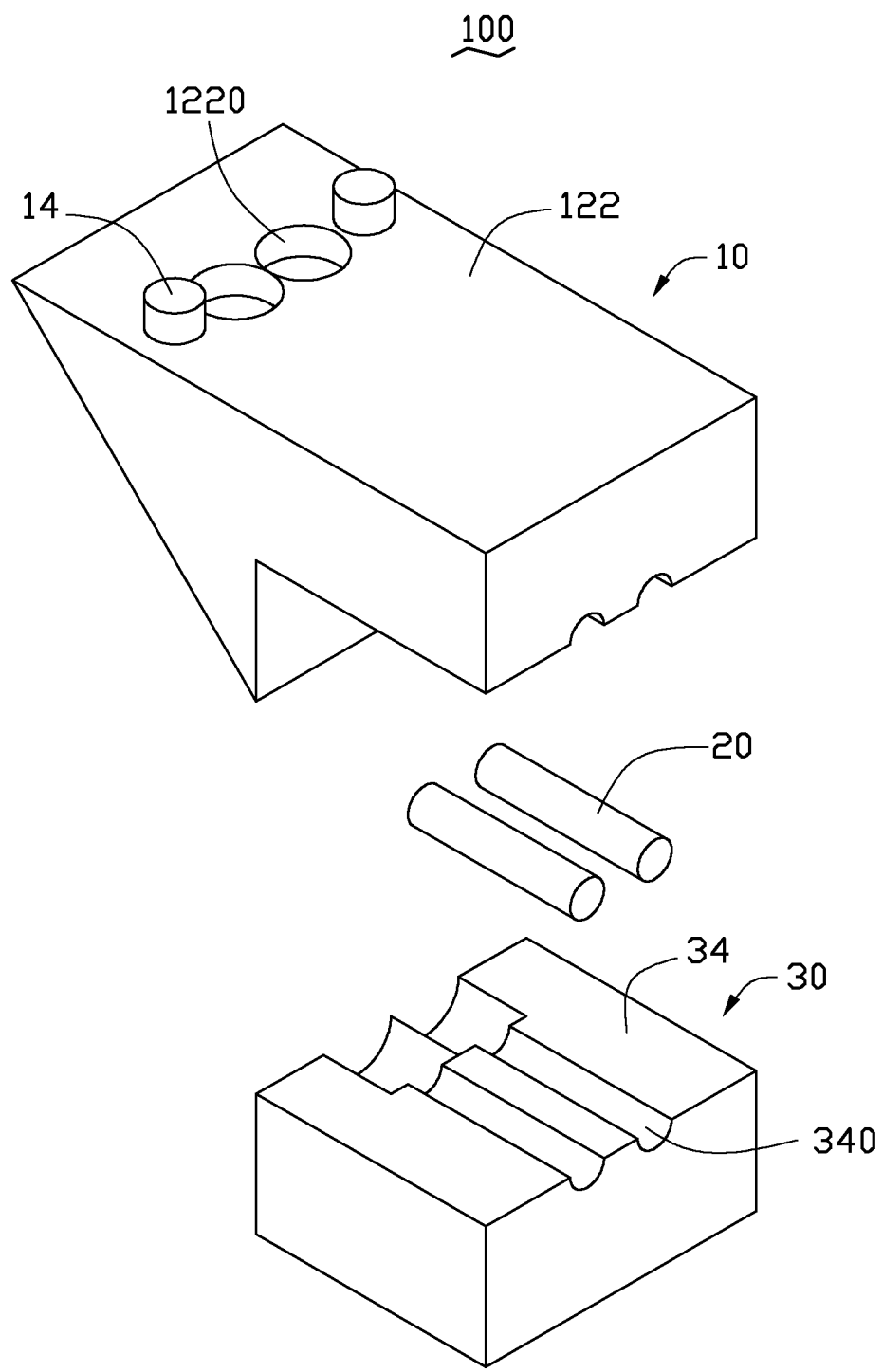
FIG. 3 is similar to FIG. 2, but viewed from another angle.

FIGS. 2-3 show that the optical coupling lens 10 includes a body portion 12, two locating posts 14, and two converging portions 16.

The body portion 12 includes a first surface 122, a second surface 124, a reflecting surface 126, a third surface 128, and a fourth surface 129. The first surface 122 and the third surface 128 are positioned at opposite sides of the body portion 12, and the first surface 122 is substantially parallel to the third surface 128. The first surface 122 defines two light-passing recesses 1220. In this embodiment, each of the two light-passing recesses 1220 is circular. The second surface 124 extends substantially perpendicularly from the third surface 128. The reflecting surface 126 is obliquely interconnected between the first surface 122 and the second surface 124. An included angle between the reflecting surface 126 and the first surface 122 is about 45 degrees, and an included angle between the reflecting surface 126 and the second surface 124 is about 45 degrees. The fourth surface 129 is perpendicularly interconnected between the first surface 122 and the third surface 128.

The third surface 128 defines two receiving grooves 1280. The two receiving grooves 1280 are substantially parallel to each other, and a longitudinal direction of each of the two receiving grooves 1280 is substantially perpendicular to the second surface 124. The receiving grooves 1280 extend from the fourth surface 129 to the second surface 124. Each of the receiving grooves 1280 includes a first receiving portion 1282 and a second receiving portion 1284. The first receiving portion 1282 and the second receiving portion 1284 are arranged in a straight line in that order from the fourth surface 129 to the second surface 124. Each of the first receiving portion 1282 and the second receiving portion 1284 is semi-circular shaped, and a diameter of the second receiving portion 1284 is larger than that of the first receiving portion 1282. The first receiving portions 1282 conform to the optical fibers 20.

The two locating posts 14 extend substantially perpendicularly from the first surface 122. The two light-passing recesses 1220 are located between the two locating posts 14. In this embodiment, each of the two locating posts 14 is substantially cylindrical. The two locating posts 14 and the two light-passing recesses 1220 are arranged collinearly.

The two converging portions 16 are formed on the second surface 124 and are received in the respective second receiving portions 1284. The two converging portions 16 correspond to the two light-passing recesses 1220. In this embodiment, the two converging portions 16 are integrally formed with the body portion 12. Each of the converging portions 16 is a convex lens.

The two optical fibers 20 are received in the respective first receiving portions 1282 and are aligned with the respective converging portions 16.

The cover 30 is substantially cuboid. The cover 30 includes a top surface 32, a bottom surface 34, and four side surfaces 36. The top surface 32 and the bottom surface 34 are positioned at opposite sides of the cover 30, and the top surface 32 is substantially parallel to the bottom surface 34. The four side surfaces 36 are connected to each other end-to-end and are interconnected between the top surface 32 and the bottom surface 34. The bottom surface 34 defines two engaging grooves 340 conforming to the optical fibers 20, and four engaging recesses 342 (shown in FIG. 4) corresponding to the two second receiving portions 1284 and corresponding to the two engaging grooves 340. The two engaging grooves 340 are substantially parallel to each other, and a longitudinal direction of each of the engaging grooves 340 is substantially parallel to that of each of the receiving grooves 1280. Each of the engaging recesses 342 communicates with a corresponding engaging groove 340.

In other embodiments, the two converging lenses 16 and the body portion 12 can be separately formed. A number of the converging lenses 16, a number of the light-passing recesses 1220, and a number of the optical fibers 20 is not limited to two, and may be more than two.

When the optical fiber coupling connector 100 is assembled, first, the optical fibers 20 are received in the first receiving portions 1282, such that the optical fibers 20 are aligned with the respective converging portions 16. In particular, the optical fibers 20 are spaced away from the respective converging portions 16, and a focal point of each of the converging portions 16 is inside the corresponding optical fiber 20. Second, the cover 30 is attached on the third surface 128 by an adhesive agent to secure the optical fibers 20 to the optical coupling lens 10. In detail, the bottom surface 34 contacts the third surface 128. The engaging grooves 340 cooperate with the first receiving portions 1282 to retain the optical fibers 20. The engaging recesses 342 cooperate with the second receiving portions 1284 to receive the converging portions 16. One of the side surfaces 36 contacts the second surface 124.

Figure 4:
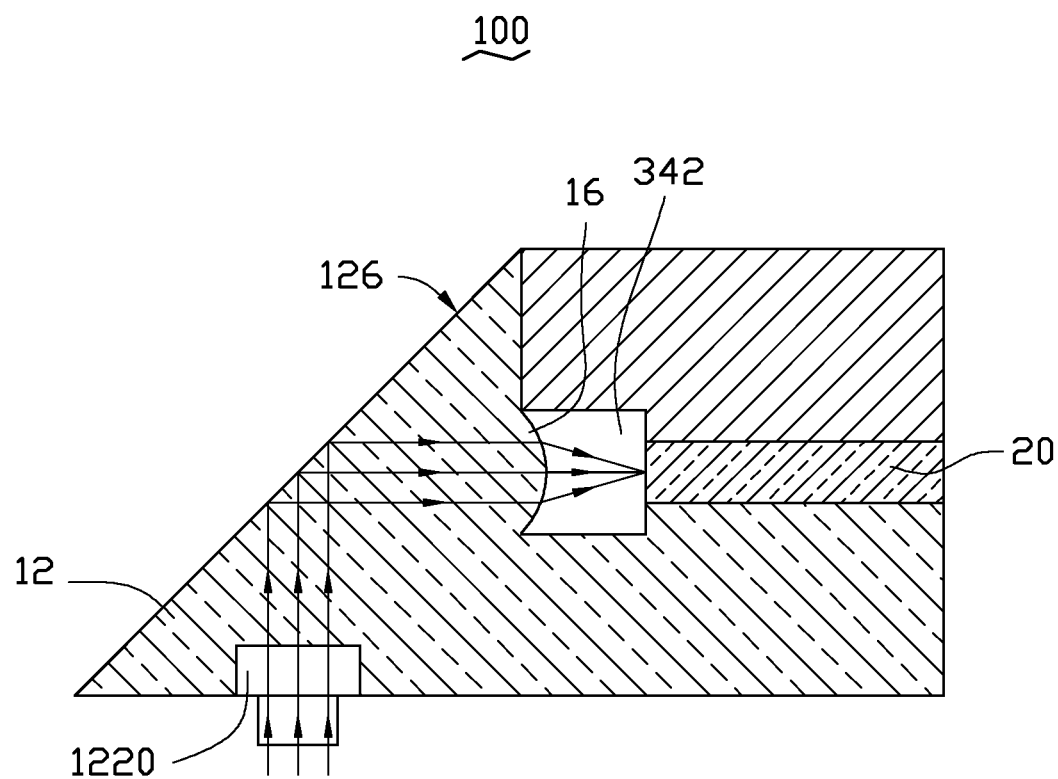
FIG. 4 is a cross-sectional view of the optical fiber coupling connector of FIG. 1, taken along the line IV-IV of FIG. 1.

FIG. 4 shows that when the optical fiber coupling connector 100 is in use, parallel light beams from one of the light-passing recesses 1220 are reflected by the reflecting surface 126 toward the corresponding converging portion 16, and are converged by the corresponding converging portion 16 into the corresponding optical fiber 20. Accordingly, light beams from one of the optical fibers 20 pass through the corresponding converging portion 16 in a parallel manner. The parallel light beams are reflected by the reflecting surface 126 toward the corresponding light-passing recess 1220, and perpendicularly exit through the light-passing recess 1220. During this process, the light path from the optical fiber 20 to the corresponding light-passing recess 1220 and the light path from the light-passing recess 1220 to the corresponding optical fiber 20 are changed about 90 degrees by the optical coupling lens 10.

Even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. An optical coupling lens comprising:
   a body portion comprising a first surface, a second surface perpendicular to the first surface, and a reflecting surface obliquely interconnected between the first surface and the second surface, the first surface defining a plurality of light-passing recess;
   two locating posts perpendicularly extending from the first surface and being apart from the light-passing recesses;
   a plurality of converging portions formed on the second surface and corresponding to the light-passing recesses, the reflecting surface configured for reflecting parallel light beams from each of the light-passing recesses toward the corresponding converging portion and for reflecting parallel light beams from each of the converging portions toward the corresponding light-passing recess.

2. The optical coupling lens as claimed in claim 1, wherein the light-passing recesses are located between the two locating posts, and the light-passing recesses and the two locating posts are arranged in a straight line.

3. The optical coupling lens as claimed in claim 1, wherein each of the light-passing recesses is cylindrical.

4. The optical coupling lens as claimed in claim 1, wherein the body portion further comprises a third surface perpendicularly connected to the second surface, the third surface is opposite to and parallel with the first surface, and the third surface defines a plurality receiving grooves aligned with the corresponding converging portions.

5. The optical coupling lens as claimed in claim 4, wherein a longitudinal direction of each of the receiving grooves is substantially perpendicular to the second surface, each of the receiving grooves comprises a first receiving portion and a second receiving portion communicating with the first receiving portion, and the second receiving portion is arranged between the first receiving portion and the second surface.

6. An optical fiber coupling connector comprising:
   an optical coupling lens comprising:
      a body portion comprising a first surface, a second surface perpendicular to the first surface, and a reflecting surface obliquely interconnected between the first surface and the second surface, the first surface defining a plurality of light-passing recesses;
      two locating posts perpendicularly extending from the first surface and being apart from the light-passing recesses;
      a plurality of converging portions formed on the second surface and corresponding to the light-passing recesses, the reflecting surface configured for reflecting parallel light beams from each of the light-passing recesses toward the corresponding converging portion and reflecting parallel light beams from each of the converging portions toward the corresponding light-passing recess; and
      a plurality of optical fibers aligned with the respective converging portions.

7. The optical fiber coupling connector as claimed in claim 6, wherein the light-passing recesses are located between the two locating posts, and the light-passing recesses and the two locating posts are arranged in a straight line.

8. The optical fiber coupling connector as claimed in claim 6, wherein each of the light-passing recesses is cylindrical.

9. The optical fiber coupling connector as claimed in claim 6, wherein the body portion further comprises a third surface perpendicularly connected to the second surface, the third surface is opposite to and parallel with the first surface, the third surface defines a plurality receiving grooves aligned with the corresponding converging portions, and the optical fibers are received in the respective receiving grooves.

10. The optical fiber coupling connector as claimed in claim 9, wherein a longitudinal direction of each of the receiving grooves is substantially perpendicular to the second surface, each of the receiving grooves comprises a first receiving portion and a second receiving portion communicating with the first receiving portion, the second receiving portion is arranged between the first receiving portion and the second surface, and the optical fibers are received in the respective first receiving portions.

11. The optical fiber coupling connector as claimed in claim 10, further comprising a cover, wherein the cover is attached on the third surface to secure the optical fibers to the optical coupling lens.

12. The optical fiber coupling connector as claimed in claim 11, wherein the cover comprises a top surface and an opposite bottom surface, the bottom surface defines a plurality of engaging grooves and a plurality of engaging recesses, the engaging grooves cooperate with the first receiving portions to retain the respective optical fibers, and the engaging recesses cooperate with the second receiving portions to receive the respective converging lenses.

* * * * *